United States Patent [19]

Lucas

[11] Patent Number: 4,680,364

[45] Date of Patent: Jul. 14, 1987

[54] ROOM TEMPERATURE VULCANIZABLE SILICONE COMPOSITIONS HAVING IMPROVED ADHESION

[75] Inventor: Gary M. Lucas, Scotia, N.Y.

[73] Assignee: General Electric Company, Waterford, N.Y.

[21] Appl. No.: 895,522

[22] Filed: Aug. 11, 1986

Related U.S. Application Data

[63] Continuation of Ser. No. 746,144, Jun. 18, 1985, abandoned.

[51] Int. Cl.$^4$ ............................................. C08G 77/06
[52] U.S. Cl. ..................................... 528/15; 427/387; 428/447; 528/16; 528/17; 528/18; 528/19; 528/20; 528/21; 528/33; 528/901
[58] Field of Search ..................... 528/15, 17, 18, 16, 528/19, 20, 21, 33, 901; 427/387; 428/447

[56] References Cited

U.S. PATENT DOCUMENTS

| | | | |
|---|---|---|---|
| 3,622,529 | 11/1971 | Evans | 528/17 |
| 3,708,467 | 1/1973 | Smith, Jr. et al. | 528/17 |
| 4,395,526 | 7/1983 | White et al. | 528/33 |
| 4,424,157 | 1/1984 | Chung | 528/33 |
| 4,483,972 | 11/1984 | Mitchell | 528/33 |
| 4,489,199 | 12/1984 | Wengrovius | 528/33 |

*Primary Examiner*—Melvyn I. Marquis
*Attorney, Agent, or Firm*—Gary L. Loser; John W. Harbour

[57] ABSTRACT

There is provided a room temperature vulcanizable silicone rubber composition which upon curing to the solid, elastic state exhibits improved adhesion to various substrates, comprising:

(a) a polydiorganosiloxane wherein the silicon atom at each polymer chain end has bonded thereto at least two hydrolyzable groups,
(b) an effective amount of non-chelate condensation catalyst, and
(c) an effective amount of metal chelate adhesion promoter.

19 Claims, No Drawings

ROOM TEMPERATURE VULCANIZABLE SILICONE COMPOSITIONS HAVING IMPROVED ADHESION

This application is a continuation of application Ser. No. 764,144, filed June 18, 1985, now abandoned.

BACKGROUND OF THE INVENTION

The present invention relates to room temperature vulcanizable silicone rubber compositions which exhibit improved adhesion upon curing. More particularly, the present invention relates to room temperature vulcanizable silicone rubber compositions comprising a polydiorganosiloxane wherein the silicon atom at each polymer chain end is terminated with at least two hydrolyzable groups, a non-chelate condensation catalyst, and a metal chelate adhesion promoter.

Prior to the present invention it was well known in the art that various metal salts of carboxylic acids, metal chelates, organic acids and organic bases could be used as condensation catalysts for room temperature vulcanizable silicone rubber compositions.

Evans, U.S. Pat. No. 3,622,529, discloses a composition stable under substantially anhydrous conditions and curable to the solid, elastic state in the presence of moisture which comprises a silanol chainstopped polydiorganosiloxane, an imidatosilane of the formula

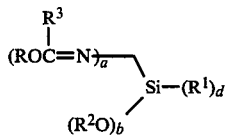

where R and $R^2$ are each organic radicals of not more than 18 carbon atoms selected from hydrocarbyl, halohydrocarbyl, nitrohydrocarbyl and alkoxyhydrocarbyl; $R^1$ is hydrogen or a radical selected from hydrocarbyl, halohydrocarbyl, and cyanoalkyl; $R^3$ is hydrogen or an organic radical of not more than 18 carbon atoms selected from hydrocarbyl, halohydrocarbyl, nitrohydrocarbyl, alkoxyhydrocarbyl, dialkylamino, and

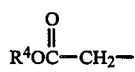

wherein $R^4$ is an organic radical selected from aliphatic hydrocarbyl, aliphatic halohydrocarbyl, aliphatic nitrohydrocarbyl and

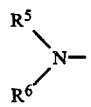

where $R^5$ and $R^6$ are each aliphatic hydrocarbyl, a is an integer from 2 to 4, inclusive, b is an integer from 0 to 2, inclusive, d is 0 or 1, and the sum of a, b and d is 4, and, optionally, a minor amount of carboxylic acid salt and/or chelate of a metal ranging from lead to manganese, inclusive, in the electromotive series of metals.

Smith et al., U.S. Pat. No. 3,708,467, discloses a composition stable under substantially anhydrous conditions and curable to the solid, elastic state which comprises a silanol chainstopped polydiorganosiloxane, a silane represented by the formula $R_mSi(OR^1)_{4-m}$ where R and $R^1$ are radicals having not more than about 8 carbon atoms selected from the group consisting or hydrocarbyl, halohydrocarbyl and cyano lower alkyl, and a catalyst system containing a first catalyst which is a salt, alkoxide, hydroxide or oxide of a metal ranging from lead to manganese in the electromotive series of metals and a second catalyst which is a titanium chelate.

The present invention is based on the surprising discovery that improved adhesion is obtained if a polydiorganosiloxane having the silicon atom at each polymer chain end terminated with at least two hydrolyzable groups is employed in combination with a non-chelate condensation catalyst and a metal chelate adhesion promoter.

SUMMARY OF THE INVENTION

It is an object of the present invention to provide room temperature vulcanizable silicone rubber compositions which exhibit improved adhesion to various substrates upon curing.

It is another object of the present invention to provide methods for making room temperature vulcanizable silicone rubber compositions which exhibit improved adhesion to various substrates upon curing.

In accordance with one aspect of the present invention there is provided a room temperature vulcanizable silicone rubber composition having improved adhesion upon curing, comprising:
(a) a polydiorganosiloxane wherein the silicon atom at each polymer chain end is terminated with at least two hydrolyzable radicals,
(b) an effective amount of non-chelate condensation catalyst, and
(c) an effective amount of metal chelate adhesion promoter.

DESCRIPTION OF THE INVENTION

The present invention provides room temperature vulcanizable silicone rubber compositions which cure to the solid, elastic state upon exposure to moisture and exhibit improved adhesion to various substrates, comprising:
(a) a polydiorganosiloxane wherein the silicon atom at each polymer chain end is terminated with at least two hydrolyzable radicals,
(b) an effective amount of non-chelate condensation catalyst, and
(c) an effective amount of metal chelate adhesion promoter.

Polydiorganosiloxanes wherein the silicon atom at each polymer chain end is terminated with at least two hydrolyzable radicals are known in the art. Such polydiorganosiloxanes can be represented by the general formula

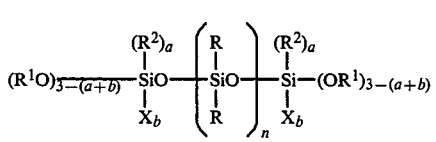

I where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl or mixture thereof; $R^1$ is a $C_{(1-8)}$ aliphatic organic radical selected from the group consisting of alkyl, alkylether, alkylester, alkylketone and alkylcyano radicals or a $C_{(7-13)}$ aralkyl radical; $R^2$ is a $C_{(1-13)}$ monovalent substituted or unsubstituted hydrocarbon radical; X is a hydrolyzable group selected from the group consisting of amido, amino, carbamato, enoxy, imidato, isocyanato, oximato, thioisocyanato and ureido radicals, a equals 0 or 1, b equals 0 to 2, inclusive, the sum of a+b equals 0 to 3, and n is an integer up to about 2500. Preferably $R^1$ and $R^2$ are methyl.

Polydiorganosiloxanes within the scope of the above formula I. are known in the art, for example, those described in U.S. Pat. No. 4,395,526 to White et al., which patent is assigned to the same assignee as the present invention and incorporated herein by reference in its entirety.

It is especially preferable that polydiorganosiloxane (a) have at least two alkoxy groups bonded to the silicon atom at each polymer chain end. These polyalkoxy terminated polydiorganosiloxanes can be made, for example, by following the teaching of Chung, U.S. Pat. No. 4,515,932, which patent is also incorporated by reference into the instant disclosure.

The condensation catalyst (b) used in the practice of the invention can be any of those known in the art except for metal chelates. The reason that metal chelates are excluded is that in the present invention metal chelates commonly employed as condensation catalysts are utilized as adhesion promoters. Thus, those skilled in the art will appreciate that although the metal chelates will inherently function as condensation catalysts, in the present invention they are utilized primarily as a means for improving the adhesion of the cured silicone composition to various substrates.

Accordingly, for purposes of the present invention, the condensation catalyst can be selected from, for example, metal salts of monocarboxylic acids and dicarboxylic acids, metal alkoxides, organic bases, organic acids, and the like. Preferred condensation catalysts are metal salts of carboxylic acids and especially preferred are tin compounds such as dibutyltindilaurate, dibutyltindiacetate, dibutyltindimethoxide, carbomethoxyphenyl tin tris-uberate, tin octoate, dimethyl tin dibutyrate, triethyl tin tartrate, tin oleate and tin naphthenate. Dibutyl tin diacetate is particularly preferred.

Examples of other metal condensation catalysts are zirconium octoate, lead 2-ethyloctoate, iron 2-ethylhexoate, cobalt 2-ethylhexoate, manganese 2-ethylhexoate, zinc 2-ethylhexoate, antimony octoate, bismuth naphthenate, zinc naphthenate and zinc stearate.

Examples of nonmetal condensation catalysts are hexylammonium acetate and benzyltrimethylammonium acetate.

Other suitable condensation catalysts will be obvious to those skilled in the art or can be easily ascertained without undue experimentation.

Generally, an effective amount of condensation catalyst is from about 0.001 to about 2 parts by weight per 100 parts by weight of polydiorganosiloxane (a). More preferably, the condensation catalyst is used in an amount ranging from about 0.1 to about 1 part by weight per 100 parts by weight of polydiorganosiloxane (a).

The metal chelates employed as adhesion promoters in the practice of the present invention can be based on lead, tin, zirconium, antimony, zinc, chromium, cobalt, nickel, aluminum, gallium, germanium or titanium.

Most preferably, however, the metal chelate is a titanium chelate.

Illustrative titanium chelate compounds useful for practicing the present invention are described in U.S. Pat. No. 3,334,067 to Weyenberg, U.S. Pat. No. 3,689,454 to Smith et al., and U.S. Pat. No. 4,438,039 to Beers et al., all of which are incorporated by reference into the present application.

Among the more preferred titanium chelates are, for example:

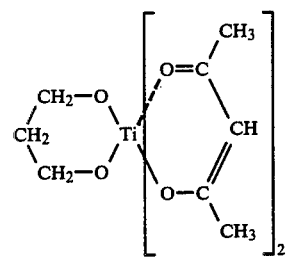

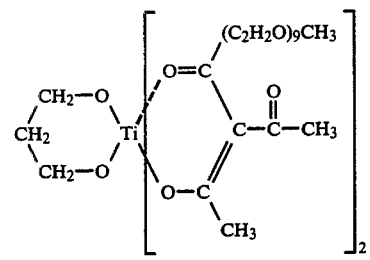

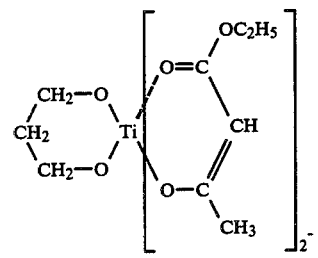

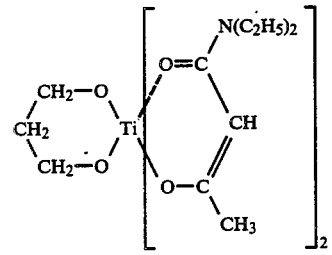

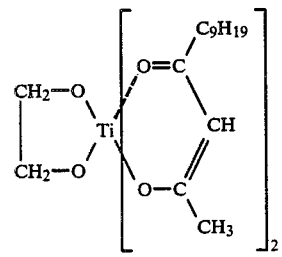

-continued

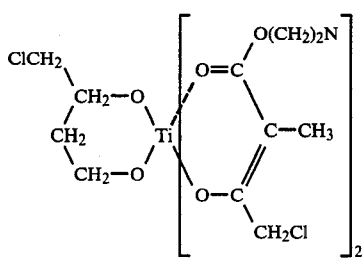

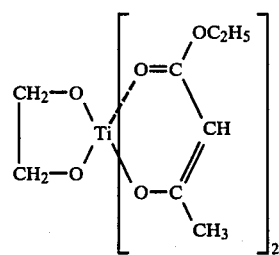

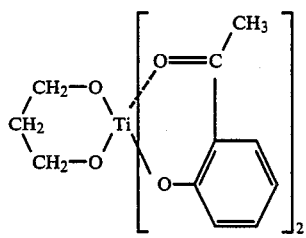

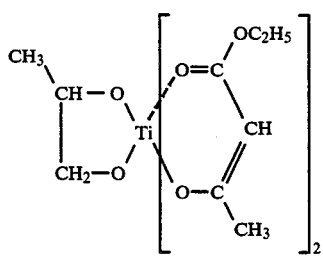

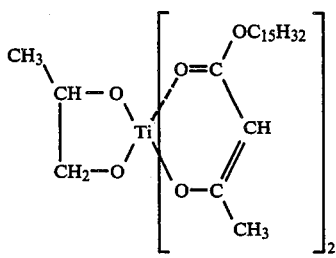

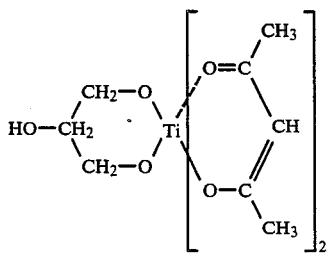

-continued

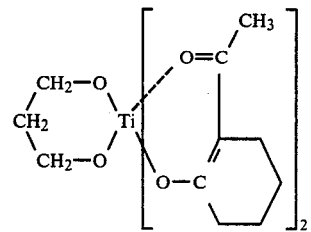

Also included are:
diisostearoylethylene titanate
Titanium dimethacrylate oxyacetate
Titanium diacrylate oxyacetate
Titanium di(cumylphenolate)oxyacetate
Titanium di(dioctylphosphate)oxyacetate
di(dioctylphosphate)ethylene titanate
Titanium di(dioctylpyrophosphate)oxyacetate
di(dioctylpyrophosphate)ethylene titanate.

The following titanates are particularly preferred.

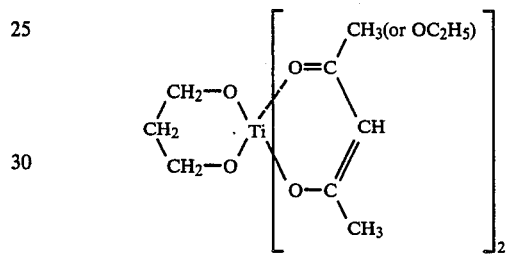

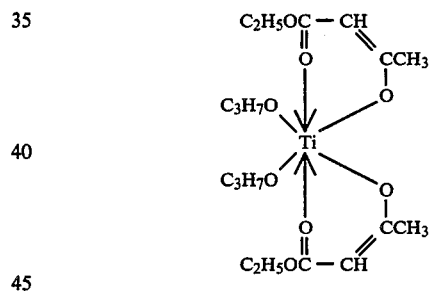

It has been found that an effective amount of metal chelate adhesion promoter generally ranges from about 0.05 to about 2 percent by weight of polydiorganosiloxane (a). Of course, more can be used but no particular advantage is obtained thereby. If less than about 0.05 percent by weight of metal chelate is utilized, the adhesive bond between the silicone elastomer and the substrate is not sufficiently strong for most purposes. In more preferred embodiments the metal chelate is present in an amount of from about 0.1 to about 1.5 percent by weight of polydiorganosiloxane (a). Of course, mixtures of metal chelates are also contemplated by the present invention.

Conventional additives such as fillers, plasticizers, crosslinking agents, scavengers for hydroxy functional groups, and the like may also be included in the compositions of the present invention.

In the practice of the present invention, the room temperature vulcanizable compositions can be made by agitating, for example stirring, the respective ingredients of the curable composition in the substantial absence of moisture. The temperature can vary from about 0° C. to about 180° C. depending upon the degree of blending, the type and amount of filler, etc.

In a preferred method for making the compositions of the present invention the polydiorganosiloxane having at least two hydrolyzable groups at each polymer chain end is admixed with reinforcing filler and plasticizing fluid to form an RTV base. Thereafter, a silane crosslinking agent, a scavenger for hydroxy functional groups, condensation catalyst, and metal chelate adhesion promoter are mixed with the RTV base.

In order to better enable the artisan to practice the present invention, the following examples are provided by way of illustration and not by way of limitation. All parts are by weight unless otherwise noted.

EXAMPLES

Example 1

A vinyldimethoxy endstopped polydimethylsiloxane was prepared by charging a one gallon Ross ® mixer equipped with a vacuum line and nitrogen purge with 100 parts by weight silanol endstopped polydimethylsiloxane having a viscosity of 22,000 centipoise at 25° C., 1.5 parts by weight vinyltrimethoxysilane, 0.2 parts by weight dibutylamine and 0.05 parts by weight acetic acid. This mixture was agitated for 15 minutes at 100° C. under a nitrogen atmosphere. An additional 45 minutes mix at 100° C. under a 5 mm Hg vacuum yielded a shelf stable vinyldimethoxy endstopped polydimethylsiloxane having a viscosity of 26,900 centipoise at 25° C.

Example 2

A one gallon Baker-Perkins mixer equipped with a vacuum line and nitrogen purge was charged with 100 parts by weight of the vinylmethoxy endstopped polydimethylsiloxane prepared in Example 1, 40 parts by weight of fumed silica filler treated with octamethylcyclotetrasiloxane and hexamethyldisilazane, 40 parts by weight of a 3000 centipoise t-butyl-silanol endstopped polydimethylsiloxane, and 15 parts by weight of a 50 centipoise silanol endstopped polydimethylsiloxane. This mixture was agitated under 20 mm Hg vacuum for 60 minutes to provide an RTV base.

To 100 parts by weight of the RTV base was added 7 parts by weight vinyltrimethoxysilane crosslinking agent, 2 parts by weight hexamethyldisilazane scavenger for hydroxy functional groups, 1.0 part by weight dipropoxytitanium-bis-(ethylacetoacetate) and 0.1 part by weight dibutyltindiacetate, using a Semco ® catalyzer/mixer. Following mixing, a profile of the physical properties of the composition was obtained. The results are set forth in Table 1.

TABLE 1

| Example 2 Experimental Results | |
|---|---|
| Property | Exp. 2 Results |
| Sp. Gravity | 1.085 |
| Application Rate, g/min. | 240 |
| Tack Free Time, min. | 30 |
| Flow, inch | 0.05 |
| Durometer, Shore A* | 33 |
| Tensile, psi* | 519 |
| Elongation, %* | 491 |
| Peel Adhesion ppi** | |
| Alum. 2024 | 80 |
| Cold rolled steel | 55 |
| Glass | 83 |
| 48 hr/100° C. Accel. Age** | |
| Durometer, Shore A | 35 |
| Tensile, psi | 409 |

TABLE 1-continued

| Example 2 Experimental Results | |
|---|---|
| Property | Exp. 2 Results |
| Elongation, % | 461 |

*7 day cure at 50% R.H. and 25° C.
**14 day cure at 50% R.H. and 25° C.

Example 3

Example 1 was repeated, using 1.5 parts by weight methyltrimethoxysilane to provide a methyldimethoxy endstopped polydimethylsiloxane having a viscosity of 26,500 centipoise at 25° C.

Example 4

An RTV base was prepared as in Example 2 using the methyldimethoxy endstopped polymer of Example 3 and vinyltrimethoxysilane crosslinking agent was replaced with 1 part by weight methyltrimethoxysilane crosslinking agent. The physical properties of this composition were also obtained and are set forth in Table 2.

TABLE 2

| Example 4 Experimental Results | |
|---|---|
| Property | Exp. 4 Results |
| Sp. Gravity | 1.086 |
| Application Rate, g/min. | 224 |
| Tack Free Time, min. | 30 |
| Flow, inch | 0.05 |
| Durometer, Shore A* | 35 |
| Tensile, psi* | 498 |
| Elongation, %* | 550 |
| Peel Adhesion ppi** | |
| Alum. 2024 | 74 |
| Cold rolled steel | 68 |
| Glass | 82 |
| 48 hr/100° C. Accel. Age** | |
| Durometer, Shore A | 31 |
| Tensile, psi | 382 |
| Elongation, % | 491 |

*7 day cure at 50% R.H. and 25° C.
**14 day cure at 50% R.H. and 25° C.

Example 5

In this example, Example 4 was repeated without the addition of titanium chelate. The results are set forth in Table 3.

TABLE 3

| Example 5 Experimental Results | |
|---|---|
| Property | Exp. 5 Results |
| Sp. Gravity | 1.083 |
| Application Rate, g/min. | 201 |
| Tack Free Time, min. | 30 |
| Flow, inch | 0.05 |
| Durometer, Shore A* | 31 |
| Tensile, psi* | 435 |
| Elongation, %* | 502 |
| Peel Adhesion ppi** | |
| Alum. 2024 | 0 |
| Cold rolled steel | 0 |
| Glass | 0 |
| 48 hr/100° C. Accel. Age** | |
| Durometer, Shore A | 30 |
| Tensile, psi | 401 |
| Elongation, % | 398 |

*7 day cure at 50% R.H. and 25° C.
**14 day cure at 50% R.H. and 25° C.

Example 6

Example 4 was again repeated, however, this time 1.0 part by weight aminoethylaminopropyltrimethoxysilane was used as an adhesion promoter in place of the titanium chelate. The results are reported in Table 4.

TABLE 4

| Example 6 Experimental Results | |
|---|---|
| Property | Exp. 6 Results |
| Sp. Gravity | 1.080 |
| Application Rate, g/min. | 281 |
| Tack Free Time, min. | 20 |
| Flow, inch | 0.05 |
| Durometer, Shore A* | 41 |
| Tensile, psi* | 472 |
| Elongation, %* | 410 |
| Peel Adhesion ppi** | |
| Alum. 2024 | 12 |
| Cold rolled steel | 4 |
| Glass | 14 |
| 48 hr/100° C. Accel. Age** | |
| Durometer, Shore A | 38 |
| Tensile, psi | 402 |
| Elongation, % | 451 |

*7 day cure at 50% R.H. and 25° C.
**14 day cure at 50% R.H. and 25° C.

Example 7

Example 4 was repeated, however, this time 1.0 parts by weight of 1,3-dioxypropanetitanium-bis(acetylacetonate) was used as the adhesion promoter. The test results are provided in Table 5.

TABLE 5

| Example 7 Experimental Results | |
|---|---|
| Property | Exp. 7 Results |
| Sp. Gravity | 1.089 |
| Application Rate, g/min. | 201 |
| Tack Free Time, min. | 30 |
| Flow, inch | 0.05 |
| Durometer, Shore A* | 42 |
| Tensile, psi* | 520 |
| Elongation, %* | 641 |
| Peel Adhesion ppi** | |
| Alum. 2024 | 71 |
| Cold rolled steel | 58 |
| Glass | 86 |
| 48 hr/100° C. Accel. Age** | |
| Durometer, Shore A | 34 |
| Tensile, psi | 441 |
| Elongation, % | 519 |

*7 day cure at 50% R.H. and 25° C.
**14 day cure at 50% R.H. and 25° C.

I claim:

1. A curable composition comprising:
   (a) a polydiorganosiloxane wherein the silicon atom at each polymer chain end is terminated with at least two hydrolyzable groups,
   (b) an effective amount of non-chelate metal salt of a monocarboxylic acid, metal salt of a dicarboxylic acid, metal alkoxide or mixture thereof condensation catalyst, and
   (c) an effective amount of metal chelate adhesion promoter.

2. A composition as in claim 1, wherein the polydiorganosiloxane has the general formula

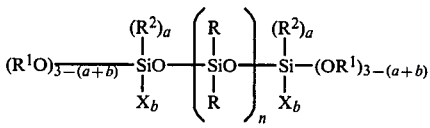

where R is a $C_{(1-13)}$ monovalent substituted or unsubstituted hydrocarbon radical; $R^1$ is a $C_{(1-8)}$ aliphatic organic radical selected from the group consisting of alkyl, alkylether, alkylester, alkylketone and alkylcyano radicals or a $C_{(7-13)}$ aralkyl radical; $R^2$ is a $C_{(1-13)}$ monovalent substituted or unsubstituted hydrocarbon radical; X is a hydrolyzable group selected from the group consisting of amido, amino, carbamato, enoxy, imidato, isocyanato, oximato, thioisocyanato and ureido radicals; a equals 0 or 1; b equals 0 to 2, inclusive; the sum of a+b equals 0 to 3, inclusive; and n is an integer up to about 2500.

3. A composition as in claim 2, wherein R is methyl or a mixture of a major amount of methyl and a minor amount of phenyl, cyanoethyl, trifluoropropyl, vinyl or mixture thereof; $R^1$ is methyl; and $R^2$ is methyl.

4. A composition as in claim 3, wherein the polydiorganosiloxane has at least two methoxy groups bonded to the silicon atom at each polymer chain end.

5. A composition as in claim 1 or 2, wherein the metal is tin.

6. A composition as in claim 1 or 2, wherein the condensation catalyst is present in an amount of from about 0.001 to about 2 parts by weight per 100 parts by weight of polydiorganosiloxane.

7. A composition as in claim 1 or 2, wherein the metal chelate is based on a metal selected from the group consisting of lead, tin, zirconium, antimony, zinc, chromium, cobalt, nickel, aluminum, gallium, germanium and titanium.

8. A composition as in claim 7, wherein the metal chelate is a titanium chelate.

9. A composition as in claim 8, wherein the titanium chelate is present in an amount of from about 0.05 to about 2 parts by weight per 100 parts by weight of the polydiorganosiloxane.

10. The cured composition of claim 1.

11. The cured composition of claim 2.

12. A method for making a curable composition, comprising:
   I. mixing under substantially anhydrous conditions:
      (a) a polydiorganosiloxane wherein the silicon atom at each polymer chain end is terminated with at least two hydrolyzable groups,
      (b) an effective amount of non-chelate metal salt of a monocarboxylic acid, metal salt of dicarboxylic acid, metal alkoxide or mixture thereof condensation catalyst, and
      (c) an effective amount of metal chelate adhesion promoter.

13. A method as in claim 12, wherein the polydiorganosiloxane has the general formula

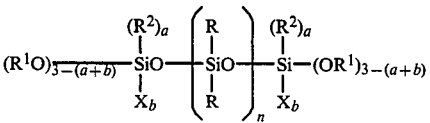

where R is a $C_{(1-13)}$ monovalent substituted or unsubstituted hydrocarbon radical; $R^1$ is a $C_{(1-8)}$ aliphatic organic radical selected from the group consisting of alkyl, alkylether, alkylester, alkylketone and alkylcyano radicals or a $C_{(7-13)}$ aralkyl radical; $R^2$ is a $C_{(1-13)}$ monovalent substituted or unsubstituted hydrocarbon radical; X is a hydrolyzable group selected from the group consisting of amido, amino, carbamato, enoxy, imidato, isocyanato, oximato, thioisocyanato and ureido radicals; a equals 0 or 1; b equals 0 to 2, inclusive; the sum of a+b equals 0 to 3, inclusive; and n is an integer up to about 2500.

14. A method as in claim 13, wherein the polydiorganosiloxane has a least two alkoxy groups bonded to the silicon atom at each polymer chain end.

15. A method as in claim 13, wherein the metal is tin.

16. A method as in claim 13 or 15, wherein the condensation catalyst is present in an amount of from about 0.001 to about 2 parts by weight per 100 parts by weight of polydiorganosiloxane.

17. A method as in claim 12, wherein the metal chelate is based on a metal selected from the group consisting of lead, tin, zirconium, antimony, zinc, chromium, cobalt, nickel, aluminum, gallium, germanium and titanium.

18. A method as in claim 12, 13, 14, or 15, wherein the metal chelate is a titanium chelate.

19. A method as in claim 16, wherein the titanium chelate is present in an amount of from about 0.05 to about 2 parts by weight per 100 parts by weight of polydiorganosiloxane.

* * * * *